United States Patent
Cournanc

[19]

[11] Patent Number: 5,811,677
[45] Date of Patent: Sep. 22, 1998

[54] MATERIAL INTERFACE LEVEL SENSING

[75] Inventor: Thomas C. Cournanc, Westmount, Canada

[73] Assignee: Bindicator Company, Port Huron, Mich.

[21] Appl. No.: 726,774

[22] Filed: Oct. 7, 1996

[51] Int. Cl.⁶ .................................................. G01F 23/28
[52] U.S. Cl. ........................................ 73/304 R; 73/291
[58] Field of Search ............................ 73/290 R, 304 R, 73/291

[56] References Cited

U.S. PATENT DOCUMENTS

| | | |
|---|---|---|
| 3,296,862 | 1/1967 | Ziniuk . |
| 3,424,002 | 1/1969 | Johnson . |
| 3,474,337 | 10/1969 | Petrick . |
| 3,572,119 | 3/1971 | Bak . |
| 3,695,107 | 10/1972 | Hellmuth et al. . |
| 3,703,829 | 11/1972 | Dougherty . |
| 3,812,422 | 5/1974 | DeCarollis . |
| 3,874,237 | 4/1975 | Zwarts . |
| 4,135,397 | 1/1979 | Krake . |
| 4,170,135 | 10/1979 | Booman et al. . |
| 4,307,267 | 12/1981 | Peoples . |
| 4,359,902 | 11/1982 | Lawless ................................ 73/290 R |
| 4,446,562 | 5/1984 | Friedman et al. . |
| 4,453,125 | 6/1984 | Kimura et al. . |
| 4,495,807 | 1/1985 | Field et al. . |
| 4,621,226 | 11/1986 | Powell . |
| 4,649,713 | 3/1987 | Bezek . |
| 4,807,471 | 2/1989 | Cournane et al. . |
| 5,233,352 | 8/1993 | Cournane . |
| 5,588,324 | 12/1996 | Speranza ............................... 73/290 R |
| 5,602,333 | 2/1997 | Larrabee et al. ...................... 73/290 R |

Primary Examiner—Max H. Noori
Attorney, Agent, or Firm—Barnes, Kisselle Raisch, Choate, Whittemore & Hulbert

[57] ABSTRACT

Apparatus for determining levels of immiscible fluids in a vessel that includes a transmission line sensor that extends vertically within the vessel for contact with fluids within the vessel. A generator is coupled to the sensor for transmitting along the sensor a first electrical signal that continuously sweeps a predetermined frequency range. A voltage detector is coupled to the sensor for providing a second electrical signal that varies as a function of the amplitude of electrical energy reflected at the sensor from the various electrical impedance discontinuities along the sensor, including particularly interfaces between and within immiscible fluids surrounding the sensor. The frequency spectral characteristics of the second electrical signal are analyzed to determine the spatial distribution of electrical impedance along the sensor, from which the levels of immiscible fluids within the vessel are determined.

7 Claims, 2 Drawing Sheets

MATERIAL INTERFACE LEVEL SENSING

The present invention is directed to detection of level of material in a storage vessel, and more particularly to detection of the level(s) of the interface(s) between immiscible materials such as crude oil and water.

BACKGROUND AND SUMMARY OF THE INVENTION

U.S. Pat. No. 4,807,471, assigned to the assignee hereof, discloses a technique for measuring the level of material in a storage vessel. A transmission line sensor is suspended vertically within the vessel in such a way that material within the vessel surrounds and contacts the sensor as the material rises and falls within the vessel. A swept frequency generator is coupled to the transmission line sensor so as to transmit along the sensor a sinusoidal signal that automatically and continuously sweeps a predetermined frequency range. The signal reflected from the upper surface of the material in the vessel, which represents an electrical impedance discontinuity along the transmission line sensor, combines with the transmitted signal to form a standing wave pattern along the transmission line sensor above the material at specific frequencies associated with the free length of the sensor above the material, and therefore with material level. The free length of the sensor above the material, and therefore material level, is determined as a function of the separation between frequencies over the swept frequency range at which this standing wave pattern occurs.

Although the technique disclosed in the referenced patent addresses and overcomes problems theretofore extant in the art, further improvements remain desirable. For example, the apparatus as disclosed in the referenced patent is not well suited for detecting levels of the interfaces between immiscible fluids, which generate multiple reflections from the various interface levels. Indeed, the apparatus disclosed in the referenced patent includes a variable impedance at the lower end of the sensor for terminating the sensor in its characteristic impedance, and therefore suppressing reflections from the lower end of the sensor. When the sensor is surrounded by layers of immiscible fluids, there will be a reflection associated with the electrical impedance discontinuity at each fluid interface, all of which must be analyzed for correct determination of the various fluid levels. Furthermore, the velocity of signal propagation within each fluid varies as a function of fluid dielectric constant, further complicating the analysis process.

It is therefore a general object of the present invention to provide an apparatus and method for not only detecting the interfaces between immiscible fluids in a vessel, but also analyzing fluid properties so that the level of each immiscible fluid interface within the storage vessel can be determined. Another and more specific object of the present invention is to provide an apparatus and method of the described character that may be readily implemented employing otherwise conventional technology.

Apparatus for determining levels of immiscible fluids in a vessel in accordance with the present invention includes a transmission line sensor that extends vertically for contact with fluids within the vessel. A generator is coupled to the sensor for transmitting along the sensor a first electrical signal that continuously sweeps a predetermined frequency range. A voltage detector is coupled to the sensor for providing a second electrical signal that varies as a function of the amplitude of electrical energy reflected at the sensor from the various electrical impedance discontinuities along the sensor, including particularly interfaces between and within immiscible fluids surrounding the sensor. The frequency spectral characteristics of the second electrical signal are analyzed to determine the spatial distribution of electrical impedance along the sensor, from which the levels of immiscible fluids within the vessel are determined.

In the preferred embodiment of the invention, the frequency spectral characteristics of the amplitude envelope of the combined transmitted and reflected signals are analyzed by identifying frequency change components associated with variation of electrical impedance along the sensor. That is, spectral lines associated with abrupt changes in electrical impedance at interfaces between immiscible fluids are identified, as are distributed continuous spectral contents associated with emulsion layers within which the electrical impedance varies. This frequency spectrum analysis preferably is performed in a digital signal processor employing conventional signal analysis techniques, such as Fourier transform analysis techniques. The amplitude of the reflected energy signal is also analyzed to determine the change in dielectric constant associated with each signal reflection, and thereby determine the velocity of signal propagation associated with each fluid layer. The frequency component information and the velocity information are combined to determine material level associated with each signal reflection.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosure of above-noted U.S. Pat. No. 4,807,471 is incorporated herein by reference for purposes of background.

Figure 1:
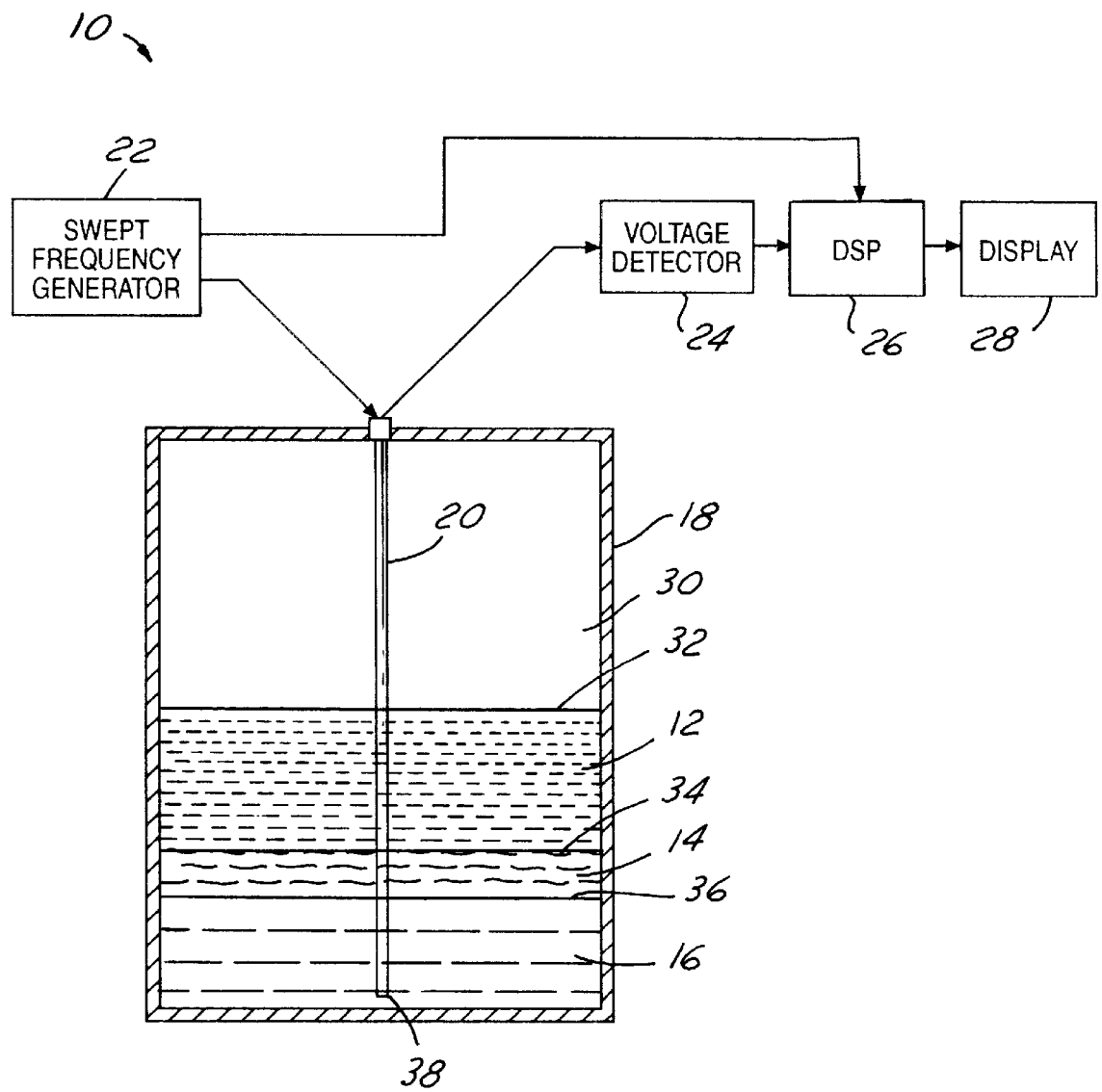
FIG. 1 is a functional block diagram of an apparatus for determining levels of immiscible fluids in a vessel in accordance with a presently preferred embodiment of the invention.

FIG. 1 illustrates an apparatus 10 in accordance with a presently preferred embodiment of the invention for measuring the levels of immiscible fluids 12, 14, 16 within a storage vessel 18. Fluid 12 may comprise crude oil, for example, while fluid 16 may comprise water removed from the crude oil and collected at the bottom of the storage vessel. In this example, intermediate layer 14 would comprises an oil/water emulsion within which the oil and water have not yet become separated, but within which there is a continuous decrease in oil concentration from the top to the bottom of the layer. A transmission line sensor 20 is suspended or otherwise mounted within vessel 18 so as to extend vertically within the vessel, preferably from top to bottom. Transmission line sensor 20 is mounted within vessel 18 in such a way as to be surrounded and contacted by the various fluids as the fluids rise and fall within the vessel. Transmission line sensor 20 preferably takes the form of an unshielded parallel-line sensor as disclosed in the referenced patent. Alternatively, sensor 20 may comprise a coaxial transmission line sensor with facility for admitting fluid to the space between the coaxial sensor elements, a strip-line sensor having parallel conductors deposited on a suitable non-conductive base, or a single-line sensor surrounded at its upper end by a grounded launch plate. In any case, as is well known in the art, the electrical impedance of each portion of the sensor varies as a function of the dielectric properties of the material that surrounds that portion of the sensor.

A swept frequency generator 22 is connected to transmission line sensor 20 in such a way as to launch or propagate a variable frequency signal along the sensor. Swept frequency generator 22 preferably is such as to launch on sensor 20 a cyclic signal that automatically and continuously sweeps a predetermined frequency range between preselected frequency limits. The transmitted signal and the return signals reflected from impedance discontinuities are fed in combination from sensor 20 to a voltage detector 24, which provides an output signal to a digital signal processor or DSP 26 that continuously varies as a function of the amplitude of signal energy at sensor 20. DSP 26 also receives a signal from generator 22 indicative of instantaneous transmitted signal frequency (or controls the frequency of transmission at generator 22) for correlating combined signal amplitude with transmission frequency, as will be described. DSP 26 provides an output to a suitable display device 28 for indicating levels of the various fluids within vessel 18, as well as other material characteristics such as water content of the oil for example.

Emulsions of immiscible liquids, given suitable conditions, separate into the component liquids, forming distinct layers within the containment vessel. During deemulsification, dissimilar liquids (e.g., 12 and 16 in FIG. 1) are usually separated by an emulsion layer (14) in which a variable proportion of one liquid is entrained in the other. Detection and ranging of the interface between different liquids and emulsions, and analysis of the content of the emulsion layers, are required to determine the quantities of the component liquids, and to measure and control industrial processes where these phenomena occur. The present invention provides automatic detection and continuous transmission of the vertical position of the liquid surface (i.e., the liquid/air interface), and the position of one or more interfaces between dissimilar liquids or liquid emulsions, and to analyze the content of any emulsion layers. A typical application is in the processing of crude oil to separate emulsified water.

Liquids may be differentiated by dielectric constant. For example aqueous liquids exhibit high dielectric constant values, while oils are quite low. The dielectric constants of all liquids are significantly higher than that of free space. The dielectric constant of a vacuum is unity by definition; for practical purposes air, gases and vapors may also be treated as having a dielectric constant of 1.0. The high frequency impedance of an unshielded electrical transmission line is dependent on the dielectric properties of its surrounding medium. In air, the dielectric constant is unity and the impedance of the line is a known constant, usually termed the characteristic impedance $Z_0$. The magnitude of $Z_0$ is determined by the cross-sectional geometry of the transmission line. When the transmission line is immersed in a liquid with dielectric $\epsilon$, the line impedance Z is reduced, and is given by:

$$Z = Z_0/\sqrt{\epsilon}. \tag{1}$$

When such a transmission line is disposed vertically in a vessel, the impedance varies spatially along the line depending on the location of the liquid surface, and of the layers of dissimilar liquids and emulsions. Within a liquid layer, the impedance is essentially constant, the actual value being determined by the dielectric properties of the particular liquid. Within an emulsion layer, the impedance may vary spatially through the height of the layer due to varying liquid content. Variation with time also occurs as the liquids de-emulsify and separate. Under certain conditions, the emulsion layers disappear leaving multiple separate dissimilar constant impedance sections. The distribution of impedance along transmission line 20 represents the vertical location of dissimilar liquids and emulsion layers 12, 14, 16 within the vessel, and the vertical distribution of liquid content within emulsion layer 14.

Referring to FIG. 1, a high frequency signal, such as a sine wave, is transmitted by generator 22 into terminals at the top of sensor 20. This signal travels downward through the air layer 30 to the air/liquid interface 32. Depending upon the dielectric properties of liquid 12, a portion of the signal energy is reflected upward and a portion is transmitted into the liquid. This is caused by the abrupt impedance change at air/liquid interface 32. Within liquid 12, the signal travels downward to the next interface 34, where the energy is again partially reflected due to the abrupt impedance change at the interface of two dissimilar impedance zones, and the remainder is transmitted into the next layer 14. This repeats at each subsequent interface (36). Within a homogeneous liquid layer, no reflection occurs since the impedance is constant. Within emulsion layer 14, the impedance changes gradually and energy reflection is distributed accordingly. Energy reaching the bottom end 38 of sensor 20 is completely reflected by either an open or a short circuit at that point.

Energy returned to the top of sensor 20 is not reflected further because the impedance is matched to $Z_0$. Voltage envelope detector 24 measures the resultant voltage amplitude, which includes the input signal from generator 22, the signals returned from each impedance discontinuity 32, 34, 36, 38, and the distributed reflection from within emulsion layer 14. The return signals vary in amplitude and phase, compared to the input signal, dependent upon the line impedance changes and the round trip time delays, respectively. (Multi-path signals are also returned to the detector. Since these signal paths always involve three or more reflections, their amplitude is insignificant and may be ignored. Also for the sake of simplicity, transmission line attenuation and phase distortions are ignored in this discussion.)

Figure 2A:
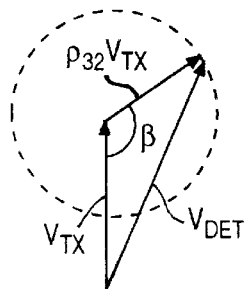
FIGS. 2A and 2B are graphic illustrations useful in discussing the basic principles of the invention.
Figure 2B:
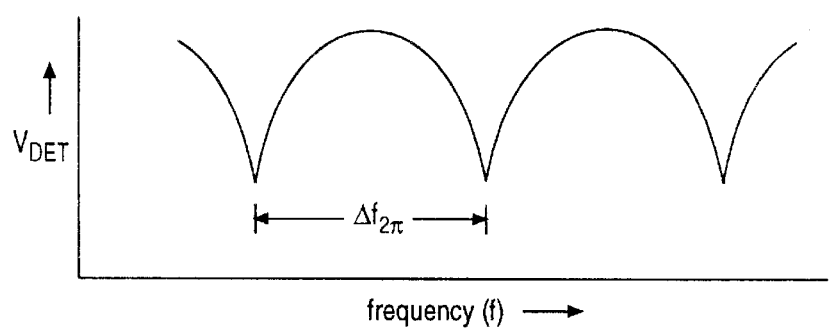

The transmitted signal and the first reflection from air/liquid interface 32 are depicted in FIGS. 2A and 2B. In vector representation, the transmitted signal amplitude is $V_{TX}$ and the reflected signal amplitude is $\rho_{32}V_{TX}$, where $\rho_{32}$ is the reflection coefficient at the interface. The detected voltage amplitude $V_{DET}$ is the vector sum of $V_{TX}$ and $\rho_{32}V_{TX}$ angle $\beta$ between the transmitted and reflected vectors is given by:

$$\beta = (2L/\lambda)2\pi \text{ radians,} \tag{2}$$

where L is the distance from the detector to the interface 32 and $\pi$ is the wavelength of the signal transmitted into the sensor. If the frequency of the signal is f, then:

$$\lambda = v_0/f, \tag{3}$$

where $v_0$ is the velocity of propagation in free space 30 above liquid 12 and is a fixed known constant. Substituting (3) into (2) gives:

$$\beta = 4\pi L f / v_0 \text{ radians.} \quad (4)$$

In a measurement cycle, frequency f is varied causing $\beta$ to vary proportionately. From (4):

$$d\beta/df = 4\pi L/v_0. \quad (5)$$

Since for a given length L, $d\beta/df$ is constant and over any frequency range $\Delta f$:

$$\Delta\beta = (4\pi L/v_0)\Delta f. \quad (6)$$

From (4) it is seen that, as f is varied continuously over a wide range, $\beta$ repeats in multiples of $2\pi$. From (6), by setting $\Delta\beta = 2\pi$, it is seen that the frequency shift $\Delta f_{2\pi}$ required for each $2\pi$ phase increment is uniquely related to L such that:

$$L = v_0/2\Delta f_{2\pi}. \quad (7)$$

To determine $\Delta f_{2\pi}$, it can be seen from FIG. 2B that, as f is varied, the envelope of $V_{DET}$ is cyclic and repeats at $\Delta f_{2\pi}$ intervals. As f is varied, the amplitude of $V_{DET}$ is sampled by DSP 26 at multiple equal frequency increments, each much smaller than $\Delta f_{2\pi}$. DSP 26, employing conventional analysis techniques, such as Fourner transform analysis techniques, then determines the envelope cycle length, i.e., $\Delta f_{2\pi}$. Length L is then derived from equation (7) providing a continuous measurement from the top of the sensor to the air/liquid interface. The height of interface 32 is then determined by subtracting this length L from the overall height of vessel 18, and the result is displayed at 28.

Figure 3A:
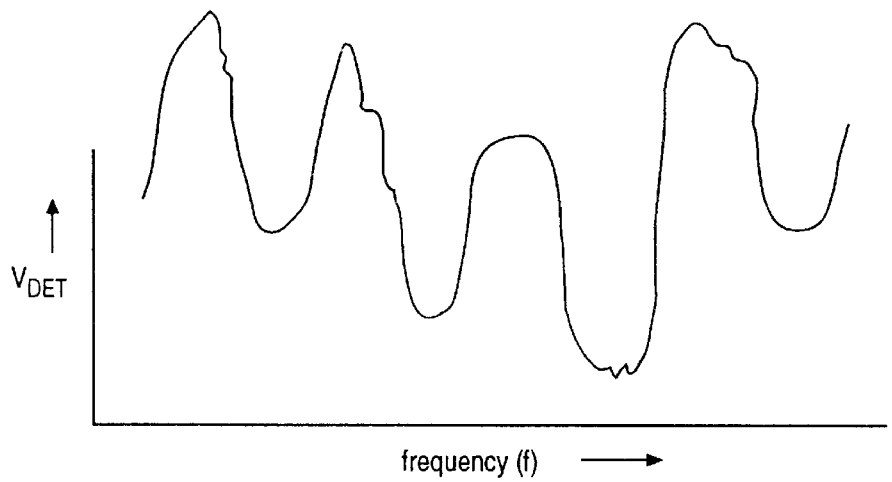
FIGS. 3A and 3B are graphic illustrations useful in discussing operation of the invention.
Figure 3B:
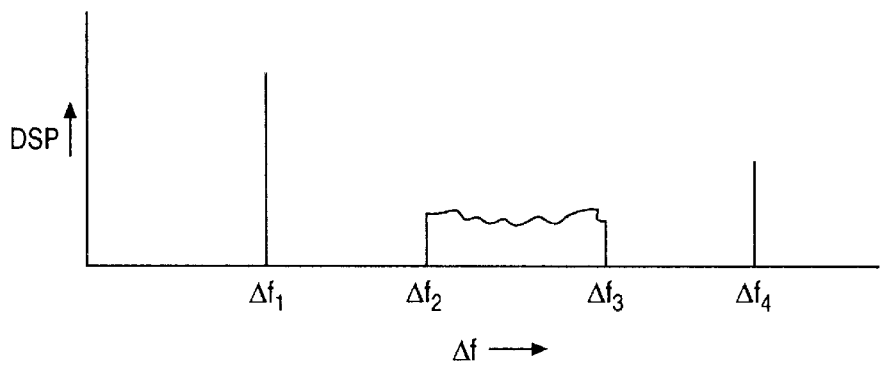

The foregoing discussion relative to FIGS. 2A and 2B treat air/liquid interface 32 as the only interface from which reflections occur. In a multiple-layer arrangement as illustrated in FIG. 1, the $V_{DET}$ envelope is a complex composite waveform as illustrated in FIG. 3A, which includes the transmitted signal and multiple reflected signals, which create multiple standing wave patterns during each frequency sweep of the transmitted signal. DSP 26 analyzes the frequency spectral characteristics of this composite waveform to obtain and identify frequency change components $\Delta f$ for each reflection source. DSP 26 thus determines the spatial distribution of electrical impedance along sensor 20. Each abrupt impedance interface produces a line in the spectrum of FIG. 3B indicating the location of an interface between immiscible fluids, such as at $\Delta f_1$ in FIG. 2B associated with air/liquid interface 32 and $\Delta f_4$ in FIG. 3B associated with bottom end 38 of sensor 20. A distributed continuous spectral content indicates the location and extent of an emulsion layer, such as between $\Delta f_2$ and $\Delta f_3$ in FIG. 3B associated with interfaces 34, 36 and the continuously varying impedance of layer 14 in FIG. 1. As discussed above in association with the simplified graphic illustration of FIG. 2B, the depth L associated with each interface can then be determined in accordance with equation (7).

In order to solve equation (7) for each interface level L, the associated velocity of propagation along sensor 20 must be determined. In free space 30 above liquid 12, this velocity is the velocity in free space $v_0$, which is a fixed predetermined constant independent of the environment in the vessel. This fixes the span factor for measurement of the liquid surface level, and no field adjustment or automatic compensation is required. The reflection coefficient $\rho_{32}$ at air/liquid interface 32 is given by:

$$\rho_{32} = (1 - \sqrt{\epsilon_{12}})/(1 + \sqrt{\epsilon_{12}}), \quad (8)$$

where $\epsilon_{12}$ is the dielectric of the liquid layer 12. $\rho_{32}$ is the ratio of the transmitted signal amplitude $V_{TX}$ to the amplitude of the echo from the liquid surface, and is determined from the output of detector 24. Rearranging (8) gives:

$$\epsilon_{12} = [(1 - \rho_{32})/(1 + \rho_{32})]^2, \quad (9)$$

allowing $\epsilon_{12}$ to be determined. The span factor in layer 12 can now be determined since the velocity $v_{12}$ in the liquid is given by:

$$v_{12} = v_0/\sqrt{\epsilon_{12}}. \quad (10)$$

This provides automatic span factor determination in the top layer of the liquid. (In many applications automatic span determination is not necessary, but may be used to fine tune the known velocity in the liquid, since dielectric constant is quite repeatable for a specific liquid type.)

The signal amplitude transmitted into first (topmost) liquid layer 12 is $1+\rho_{12}$. Since $\rho_{12}$ is known from the DSP spectrum, the amplitude of the signal incident on second layer 14 is also known. The reflection coefficient at interface 34 of the first and second liquid layers can now be determined, and from that the span factor in the second layer is determined in the same way as in the first layer. Since layer 14 is an emulsion, the reflection is distributed across the layer varies, and the velocity varies accordingly. By summation analysis of the continuous $\Delta f$ spectrum across the layer, the width of the layer can be determined. By arranging either an open circuit or a short circuit at the bottom 38 of sensor 20, a reflection always occurs at this point. Since this is at the known physical length of the sensor, it's electrical measurement can be used to verify the summation of the material level measurements. By analysis of the $\Delta f$ spectrum distributed across emulsion layer 14, the impedance distribution is determined. From equation (1), the distribution of dielectric properties is also known. When an emulsion is comprises of two liquids A and B with dielectrics $\rho_A$ and $\rho_B$ respectively, the apparent bulk dielectric constant $\rho_{APP}$ is given empirically by:

$$\rho_{APP} = \rho_A^a \rho_b^b, \quad (11)$$

where a and b are the volume ratios of liquids A and B respectively. For example, for an emulsion of crude oil ($\rho=2.2$) and water ($\rho=80$) with 90% oil and 10% water by volume:

$$\rho_{app} = 2.2^{.9} 80^{.1} = 3.15.$$

If the water content reduces to 5% the apparent dielectric constant becomes:

$$\rho_{app} = 2.2^{.96} 80^{.06} = 2.63.$$

By determining the apparent or bulk dielectric constant of emulsion layer 14, the volumetric ratio of the liquids can be deduced from the known actual dielectric constant of each constituent. For a typical oil/water emulsion, the big difference in dielectrics constants provides a sensitive indicator of the water content, providing a vital measurement in the control and optimizing of de-emulsification processing.

In summary, by transmission of a swept frequency signal into an unshielded transmission line sensor and frequency spectral analysis of the resultant standing wave voltage envelope detected at the sensor input terminals, the vertical distribution of dielectric properties in the medium surrounding the sensor is determined. Since dissimilar liquids are identifiable by dielectric properties, the location and height of stratified layers can be determined. In addition the make-up of emulsion layers can be analyzed.

I claim:

1. Apparatus for determining levels of immiscible fluids in a vessel comprising:

a transmission line sensor that extends vertically within the vessel for contact with fluids within the vessel, generator means coupled to said sensor for transmitting along said sensor a first electrical signal that continuously sweeps a predetermined frequency range, voltage detector means coupled to said sensor for providing a second electrical signal that varies as a function of amplitude of electrical energy transmitted onto and reflected at said sensor, means for analyzing frequency spectral characteristics of said second electrical signal to determine spatial distribution of electrical impedance along said sensor, and means for determining levels of immiscible fluids within the vessel as a function of said spatial distribution of electrical impedance along said sensor.

2. The apparatus set forth in claim 1 wherein said means for analyzing said frequency spectral characteristics of said second electrical signal comprises means for identifying frequency change components associated with variation of electrical impedance along said sensor.

3. The apparatus set forth in claim 2 wherein said means for identifying frequency change components comprises means for identifying spectral lines associated with abrupt changes in electrical impedance at interfaces between the immiscible fluids within the vessel.

4. The apparatus set forth in claim 3 wherein said means for identifying frequency change components further comprises means for identifying a distributed continuous spectral content associated with an emulsion layer in the vessel within which electrical impedance varies.

5. The apparatus set forth in claim 2 further comprising means responsive to amplitude of said second electrical signal for determining velocity of propagation of said first signal along said transmission line sensor within each immiscible fluid in the vessel.

6. A method of determining levels of immiscible fluids in a vessel that comprises the steps of:

(a) positioning a transmission line sensor which the vessel in such a way that the sensor is surrounded and contacted by the fluids as the fluids rise and fall within the vessel, (b) transmitting along said sensor a cyclic signal that varies continuously in frequency, (c) analyzing frequency spectral characteristics of electrical energy reflected at said sensor from the interfaces between the immiscible fluids within the vessel to determine the spatial distribution of electric impedance along the sensor, and (d) determining levels of the interfaces between the immiscible fluids in the vessel as a function of said spatial distribution of electric impedance along said sensor.

7. The method set forth in claim 6 wherein said step (c) comprises the step of identifying frequency change components associated with variations of electrical impedance at each interface between the immiscible fluids in the vessel.

* * * * *